(12) United States Patent
Hayashi

(10) Patent No.: US 10,676,025 B2
(45) Date of Patent: Jun. 9, 2020

(54) SAFE DRIVING ASSISTANCE DEVICE AND SAFE DRIVING ASSISTANCE PROGRAM PRODUCT

(71) Applicant: DENSO CORPORATION, Kariya, Aichi-pref. (JP)

(72) Inventor: Tatsuya Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/198,282

(22) Filed: Nov. 21, 2018

(65) Prior Publication Data

US 2019/0092236 A1 Mar. 28, 2019

Related U.S. Application Data

(63) Continuation of application No. PCT/JP2017/018190, filed on May 15, 2017.

(30) Foreign Application Priority Data

May 25, 2016 (JP) .................................. 2016-104317

(51) Int. Cl.
*B60Q 9/00* (2006.01)
*G08G 1/16* (2006.01)
*B60K 28/06* (2006.01)

(52) U.S. Cl.
CPC .............. *B60Q 9/008* (2013.01); *B60K 28/06* (2013.01); *G08G 1/16* (2013.01)

(58) Field of Classification Search
CPC ........... B60Q 9/008; G08G 1/16; B60K 28/06

USPC ........................................................ 340/576
See application file for complete search history.

(56) References Cited

U.S. PATENT DOCUMENTS

| 5,546,305 | A | * | 8/1996 | Kondo | G07C 5/0841 340/576 |
| 9,605,971 | B2 | * | 3/2017 | Niehsen | B62D 15/025 |
| 2006/0072792 | A1 | * | 4/2006 | Toda | B60R 25/1004 382/115 |
| 2009/0009302 | A1 | * | 1/2009 | Matsuoka | B60W 40/09 340/425.5 |
| 2009/0009309 | A1 | * | 1/2009 | Matsuoka | B60W 40/09 340/439 |

(Continued)

FOREIGN PATENT DOCUMENTS

| JP | H03167698 A | 7/1991 |
| JP | H05164568 A | 6/1993 |

(Continued)

*Primary Examiner* — Omar Casillashernandez
(74) *Attorney, Agent, or Firm* — Harness, Dickey & Pierce, P.L.C.

(57) ABSTRACT

A safe driving assistance device is provided. The safe driving assistance device determines whether a driver is in a looking aside state. The safe driving assistance device calculates at least one of a looking aside time information item and a looking aside travel distance information item as notification information. The looking aside time information item indicates information related to a time when the driver is in the looking aside state. The looking aside travel distance information item indicates information related to a travel distance of a vehicle when the driver is in the looking aside state. The safe driving assistance device causes an information notification portion to notify the notification information.

10 Claims, 10 Drawing Sheets

(56) References Cited

U.S. PATENT DOCUMENTS

| | | | |
|---|---|---|---|
| 2012/0326967 A1* | 12/2012 | Gohng | B60K 35/00 345/156 |
| 2013/0162794 A1 | 6/2013 | Wakiyama | |
| 2016/0327402 A1* | 11/2016 | Funabiki | G01C 21/365 |
| 2017/0210357 A1* | 7/2017 | Nagai | B60K 28/06 |
| 2017/0282717 A1* | 10/2017 | Jang | B60W 10/20 |
| 2018/0111551 A1* | 4/2018 | Suzuki | G06K 9/00798 |
| 2018/0329414 A1* | 11/2018 | Igarashi | B60W 50/14 |
| 2018/0350236 A1* | 12/2018 | Yamaguchi | B60R 16/02 |

FOREIGN PATENT DOCUMENTS

| | | |
|---|---|---|
| JP | 2013152700 A | 8/2013 |
| JP | 2014095987 A | 5/2014 |

\* cited by examiner

START NOTIFICATION

START NOTIFICATION

START NOTIFICATION

START NOTIFICATION

START NOTIFICATION

START NOTIFICATION

SAFE DRIVING ASSISTANCE DEVICE AND SAFE DRIVING ASSISTANCE PROGRAM PRODUCT

CROSS REFERENCE TO RELATED APPLICATIONS

The present application is a continuation application of International Patent Application No. PCT/JP2017/018190 filed on May 15, 2017, which designated the U.S. and claims the benefit of priority from Japanese Patent Application No. 2016-104317 filed on May 25, 2016. The entire disclosures of all of the above applications are incorporated herein by reference.

TECHNICAL FIELD

The present disclosure relates to a safe driving assistance device and a safe driving assistance program product.

BACKGROUND ART

A safe driving assistance device that determines whether a driver is in a looking aside state has been provided. When determining that the driver is in the looking aside state, the safe driving assistance device performs a warning.

SUMMARY

In the present disclosure, a safe driving assistance device is provided. The safe driving assistance device calculates at least one of a looking aside time information item and a looking aside travel distance information item as notification information. The safe driving assistance device causes an information notification portion to notify the notification information.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Figure 1:
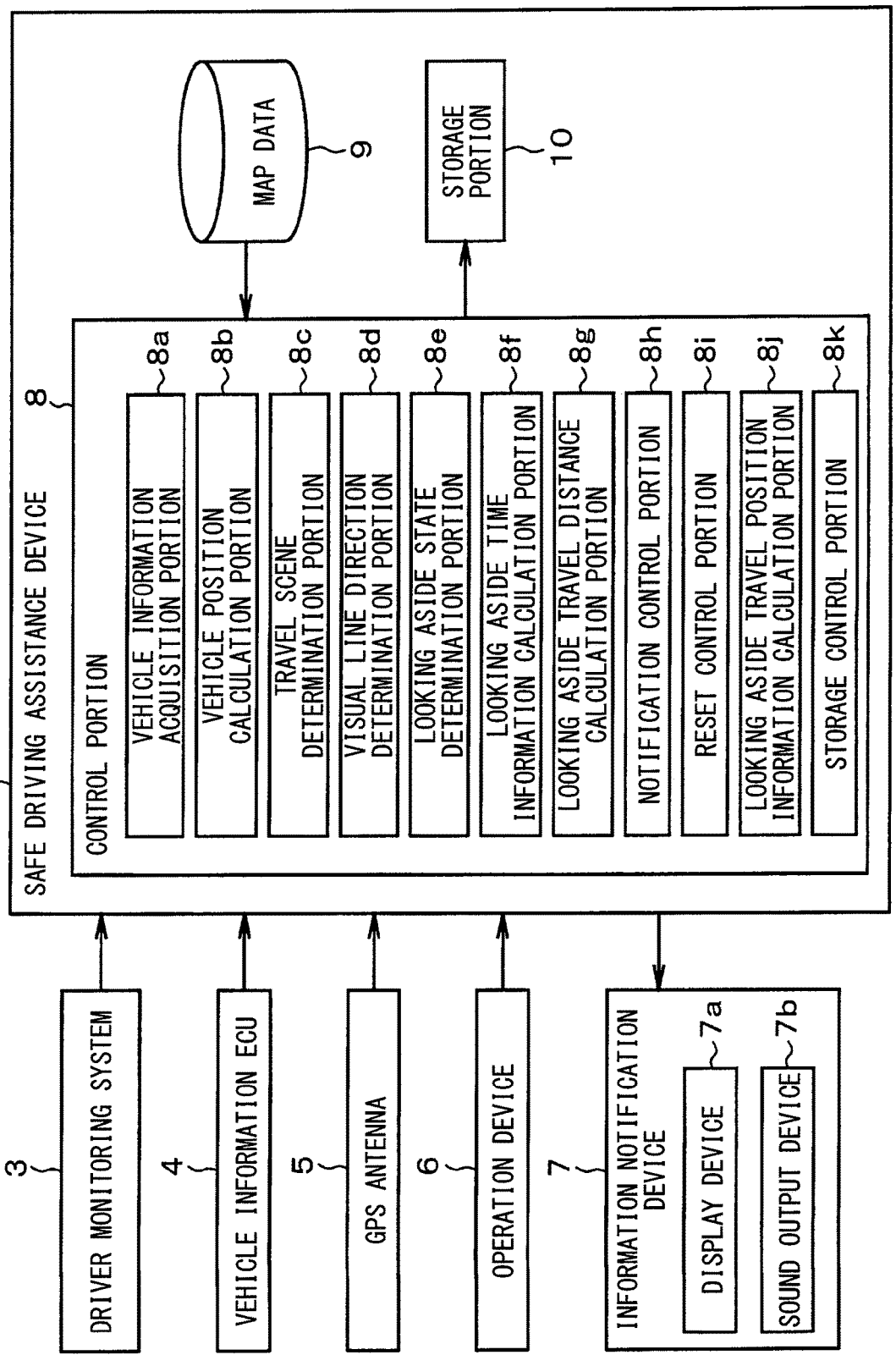
FIG. 1 is a functional block diagram showing an embodiment.
Figure 2:
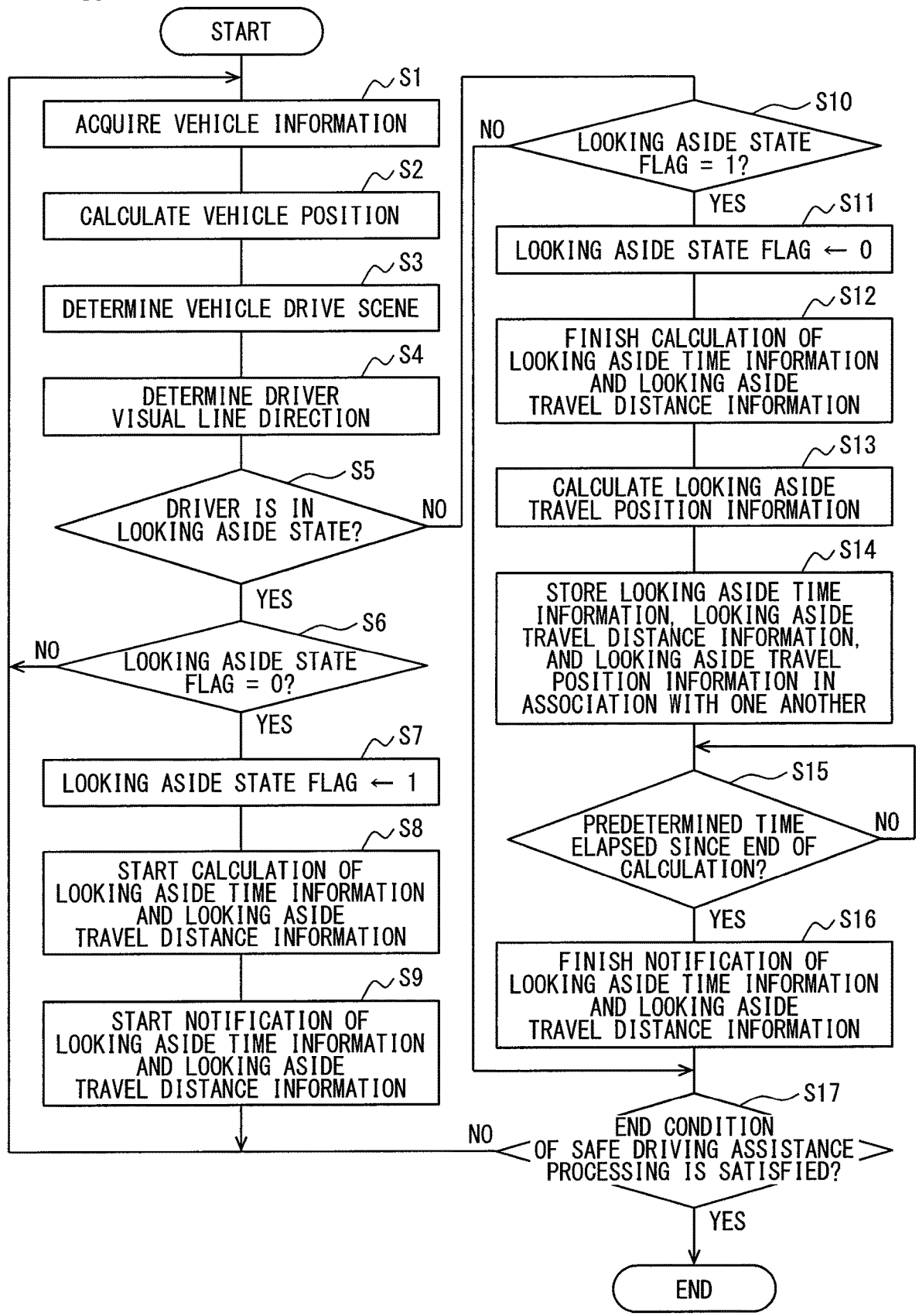
FIG. 2 is a flowchart.

In a configuration that performs a warning, there is a possibility that the warning annoy a driver. In many cases, the driver unconsciously looks aside, and the driver is not aware of the fact of looking aside. Further, even when a passenger is aware that the driver is in a looking aside state, the passenger feels uneasy in a case where it is difficult for the passenger to warn the driver.

The present disclosure provides a safe driving assistance device and a safe driving assistance program product capable of appropriately notifying a driver that the driver looks aside and appropriately urging the driver to be aware that the driver looks aside.

In the present disclosure, unlike the conventional technique that simply performs the warning, when the driver is in the looking aside state, a configuration calculates to notify at least one of the looking aside time information item or the looking aside travel distance information item. The configuration can notify the specific time or the specific travel distance for the driver in the looking aside state, so that the configuration can appropriately notify the driver that the driver looks aside, and urge the driver to be aware that the driver looks aside.

Hereinafter, an embodiment will be described with reference to the drawings. A safe driving assistance system 1 includes a safe driving assistance device 2, a driver monitoring system 3, a vehicle information ECU (Electronic Control Unit) 4, a GPS (Global Positioning System) antenna 5, an operation device 6 (corresponding to an operation portion), and an information notification device 7 (corresponding to an information notification portion).

The driver monitoring system 3 includes a driver photographing camera that photographs the upper body of the driver in a state where the driver is seated in the driver's seat. The driver monitoring system 3 transmits an image signal including an image photographed by the driver photographing camera to the safe driving assistance device 2. The driver photographing camera may be provided by a CCD (i.e., Charge Coupled Device) image sensor, a CMOS (i.e., Complementary Metal Oxide Semiconductor) image sensor, or the like, and may include a single camera or multiple cameras.

The vehicle information ECU 4 may be connected to various types of ECUs, various types of sensors, or the like through a vehicle network such as CAN (Controller Area Network). With this configuration, the vehicle information ECU 4 is capable of performing data communication with the various types of ECUs, the various types of sensors, or the like. The vehicle information ECU 4 acquires various pieces of information related to a vehicle travel as vehicle information. The vehicle information ECU 4 transmits a vehicle information signal indicative of the acquired vehicle information to the safe driving assistance device 2. The vehicle information may include vehicle velocity, acceleration, an operation state of an indicator lever, a steering angle of a steering wheel, an operation amount of an accelerator pedal, an operation amount of a brake pedal, or the like. The GPS antenna 5 captures GPS radio waves radiated from GPS satellites, and transmits a GPS signal to the safe driving assistance device 2.

The operation device 6 may be provided by a touch switch formed on a display configuring a navigation system. When the driver operates the operation device 6, the operation device 6 transmits an operation signal indicative of the driver operation to the safe driving assistance device 2. The information notification device 7 includes a display device 7a (corresponding to a display portion) and a sound output device 7b (corresponding to a sound output portion). The display device 7a may be provided by a display configuring the navigation system. The display device 7a displays display information in response to an input of a display instruction signal from the safe driving assistance device 2. The sound output device 7b may be provided by a speaker configuring the navigation system. The sound output device 7b outputs sound information in response to an input of a sound output instruction signal from the safe driving assistance device 2.

The safe driving assistance device 2 includes a control portion 8, a map data storage portion 9, which stores map data, and a storage portion 10. The map data includes road data indicative of a shape of the road, the number of lanes or the like, and intersection data indicative of a shape of an intersection or the like. Alternatively, the map data storage 9 may be provided outside the safe driving assistance device 2. The control portion 8 is provided by a microcomputer having a CPU (i.e., Central Processing Unit), a ROM (i.e., Read Only Memory), a RAM (i.e., Random Access Memory), and an I/O device (i.e., Input/Output device). The control portion 8 executes a computer program stored in a non-transitory tangible storage medium to execute a process corresponding to the computer program, and controls the overall operation of the safe driving assistance device 2.

The control portion 8 includes a vehicle information acquisition portion 8a, a vehicle position calculation portion 8b, a travel scene determination portion 8c, a visual line direction determination portion 8d, a looking aside state determination portion 8e, a looking aside time information calculation portion 8f (corresponding to a notification information calculation portion), a looking aside travel distance calculation portion 8g (corresponding to a notification information calculation portion), a notification control portion 8h, a reset control portion 8i, a looking aside travel position information calculation portion 8j, and a storage control portion 8k. Each of these devices 8a to 8k is provided by a computer program executed by the control portion 8, and is achieved by software.

The vehicle information acquisition portion 8a acquires the vehicle information using the vehicle information signal received from the vehicle information ECU 4. The vehicle position calculation portion 8b calculates a various types of parameters extracted from the GPS signal using the GPS signal received from the GPS antenna 5 so as to specify the absolute position of the vehicle by latitude and longitude. The vehicle position calculation portion 8b reads out the map data from the map data storage portion 9. The vehicle position calculation portion 8b executes processing such as map matching by comparing the specified absolute position with the map data so as to calculate the vehicle position.

The travel scene determination portion 8c determines a travel scene of the vehicle using the vehicle information and the vehicle position. Specifically, when the vehicle position is on a straight road and the steering angle indicates the straight road, the travel scene determination portion 8c determines that the vehicle travels on the straight road. When the vehicle position is on a curving road and the steering angle indicates the curving road, the travel scene determination portion 8c determines that the vehicle travels on the curving road. When the vehicle position is at the intersection, the steering angle indicates a right turn or a left turn, and the operation position of the indicator lever indicates the right turn or the left turn, the travel scene determination portion 8c determines that the vehicle turns right or left at the intersection.

The visual line direction determination portion 8d analyzes motion of a driver's head or an eyeball using the image signal received from the driver monitoring system 3 so as to determine the visual line direction of the driver. The looking aside state determination portion 8e determines whether the driver is in the looking aside state using the determination result of the travel scene determination portion 8c and the determination result of the visual line direction determination portion 8d. The vehicle may be determined that the vehicle travels on the straight road. In this case, when the visual line direction of the driver is within a predetermined angle, in which the travel direction is set as the reference, the looking aside state determination portion 8e determines that the driver is not in the looking aside state. When the visual line direction of the driver is out of the predetermined angle, the looking aside state determination portion 8e determines that the driver is not in the looking aside state. For example, when it is determined that the vehicle travels on the left curving road, the driver visually checks the left front direction as the safety confirmation. The looking aside state determination portion 8e sets the predetermined angle inclined to the left front direction and determines whether the visual line direction of the driver is within a predetermined angle so as to determine whether the driver is in the looking aside state. For example, when it is determined that the vehicle turn left at the intersection, the driver visually checks the left front direction and the left lateral direction as the safety confirmation. The looking aside state determination portion 8e sets the predetermined angle inclined to the left front direction and the left lateral direction and determines whether the visual line direction of the driver is within the predetermined angle so as to determine whether the driver is in the looking aside state. The looking aside state determination portion 8e determines as one action of looking aside from the determination that the driver is in the looking aside state to the determination that the driver is not in the looking aside state.

The looking aside time information calculation portion 8f calculates looking aside time information related to time in which the driver is in the looking aside state. In this case, the looking aside time information calculation portion 8f calculates looking aside time related to the one action of looking aside, and calculates looking aside accumulation time that accumulates the looking aside time in a predetermined period. For example, one trip from the turning on of the ignition switch to the turning off of the ignition switch may be defined as the predetermined period. In this case, the looking aside time information calculation portion 8f calculates the looking aside accumulation time by calculating the looking aside time for one trip. For example, one day (that is, twenty four hours) may be defined as the predetermined period. In this case, the looking aside time information calculation portion 8f calculates the looking aside accumulation time by calculating the looking aside time for one day.

The looking aside travel distance calculation portion 8g calculates looking aside travel distance information related to a travel distance of the vehicle when the driver is in a looking aside state. In this case, the looking aside travel distance calculation portion 8g calculates, as the looking aside travel distance, the travel distance related to the one action of looking aside, and calculates looking aside accumulation travel distance that accumulates the looking aside travel distance in the predetermined period. For example, one trip from the turning on of the ignition switch to the turning off of the ignition switch may be defined as the predetermined period. In this case, the looking aside travel distance calculation portion 8g calculates the looking aside accumulation travel distance by calculating the looking aside travel distance for one trip. For example, one day may be defined as the predetermined period. In this case, the looking aside travel distance information calculation portion 8g calculates the looking aside accumulation travel distance by calculating the looking aside travel distance for one day.

The notification control portion 8h transmits the display instruction signal and the sound output instruction signal to the information notification device 7. With this configuration, the notification control portion 8h causes the display device 7a to display the looking aside time information and the looking aside travel distance information or causes the sound output device 7b to output the sound of the looking aside time information and the looking aside travel distance information. The reset control portion 8i resets the looking aside time information and the looking aside travel distance information at a predetermined time point. For example, one trip from the turning on of the ignition switch to the turning off of the ignition switch may be defined as the predetermined period. In this case, the reset control portion 8i resets the looking aside time information and the looking aside travel distance information immediately after the switch-off of the ignition switch or immediately after the switch-on of the ignition switch. For example, one day may be defined as the predetermined period. In this case, the reset control portion 8i resets the looking aside time information and the looking aside travel distance information every time twenty four hours elapses. When the driver performs a reset operation to the operation device 6, the operation device 6 transmits the operation signal indicative of the reset operation to the reset control portion 8i. When receiving the operation signal, the reset control portion 8i resets the looking aside time information and the looking aside travel distance information regardless of the predetermined period.

The looking aside travel position information calculation portion 8j calculates looking aside travel position information related to a travel position of the vehicle when the driver is in a looking aside state. The storage control portion 8k stores the looking aside time information, the looking aside travel distance information, and the looking aside travel position information in the storage portion 10 in association with one another. The storage portion 10 may be provided by a nonvolatile storage medium and maintains the stored contents even when the ignition switch is turned from the on state to the off state.

Next, the process of the above configuration will be described with reference to FIGS. 2 to 10.

Figure 3:
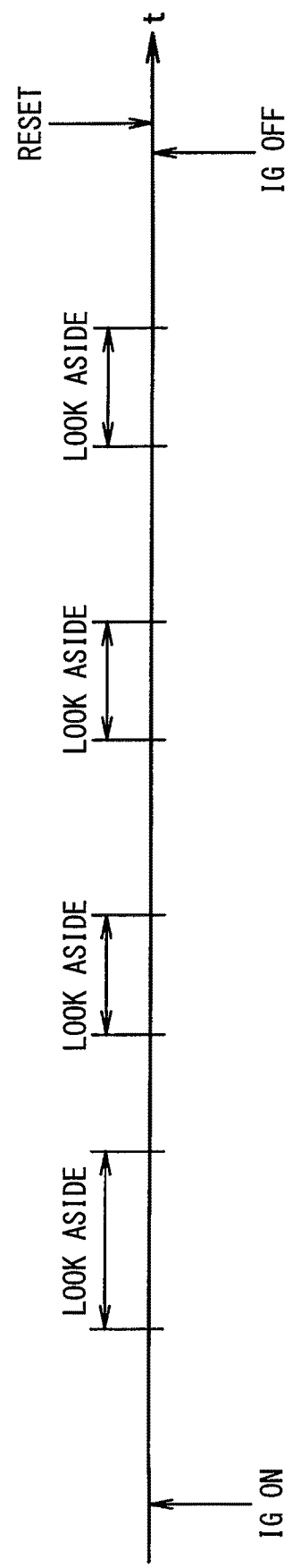
FIG. 3 is a first time point chart.

The control portion 8 executes safe driving assistance processing. When the start condition of the safe driving assistance processing, such as the switching of the ignition switch from an off state to an on state, is satisfied, the control portion 8 starts the safe driving assistance processing. In the control portion 8, the vehicle velocity equal to or greater than a predetermined velocity, a performance of a predetermined operation by the driver, or the like may add to the start condition of the safe driving assistance processing. As shown in FIG. 3, one trip from the turning on of the ignition switch to the turning off of the ignition switch is defined as the predetermined period. A case, in which the control portion 8 resets the looking aside time information and the looking aside travel distance information in a unit of one trip, will be described. With this configuration, the control portion 8 calculates the looking aside accumulation time and the looking aside accumulation travel distance for one trip as the looking aside time information and the looking aside travel distance information, respectively.

When the safe driving assistance processing is started, the control portion 8 acquires the vehicle information using the vehicle information signal received from the vehicle information ECU 4 (S1). The control portion 8 specifies the absolute position of the vehicle by latitude and longitude using the GPS signal received from the GPS antenna 5, reads out the map data from the map data storage portion 9, and calculates the vehicle position (S2). The control portion 8 determines the travel scene of the vehicle using the vehicle information and the vehicle position (S3). The control portion 8 determines the visual line direction of the driver using the image signal received from the driver monitoring system 3 (S4). The control portion 8 determines whether the driver is in the looking aside state using the determination result of the travel scene of the vehicle and the determination result of the visual line direction of the driver (S5, corresponding to a looking aside state determination process).

When determining that the driver is in the looking aside state (S5:YES), the control portion 8 determines a looking aside state flag indicative whether the looking aside state had been determined (S6). When determining that the looking aside state flag is "0", that is, the looking aside state had not been determined, and determining that the driver is in the looking aside state in the present determination (S6:YES), the control portion 8 sets the looking aside state flag to "1" (S7). The control portion 8 starts calculating the looking aside time information and the looking aside travel distance information (S8, corresponding to a notification information calculation process). The control portion 8 starts the transmission of the display instruction signal and the sound output instruction signal to the information notification device 7, starts the notification of the looking aside time information and the looking aside travel distance information (S9, corresponding to a notification control process), and the procedure returns to S1.

Figure 4:
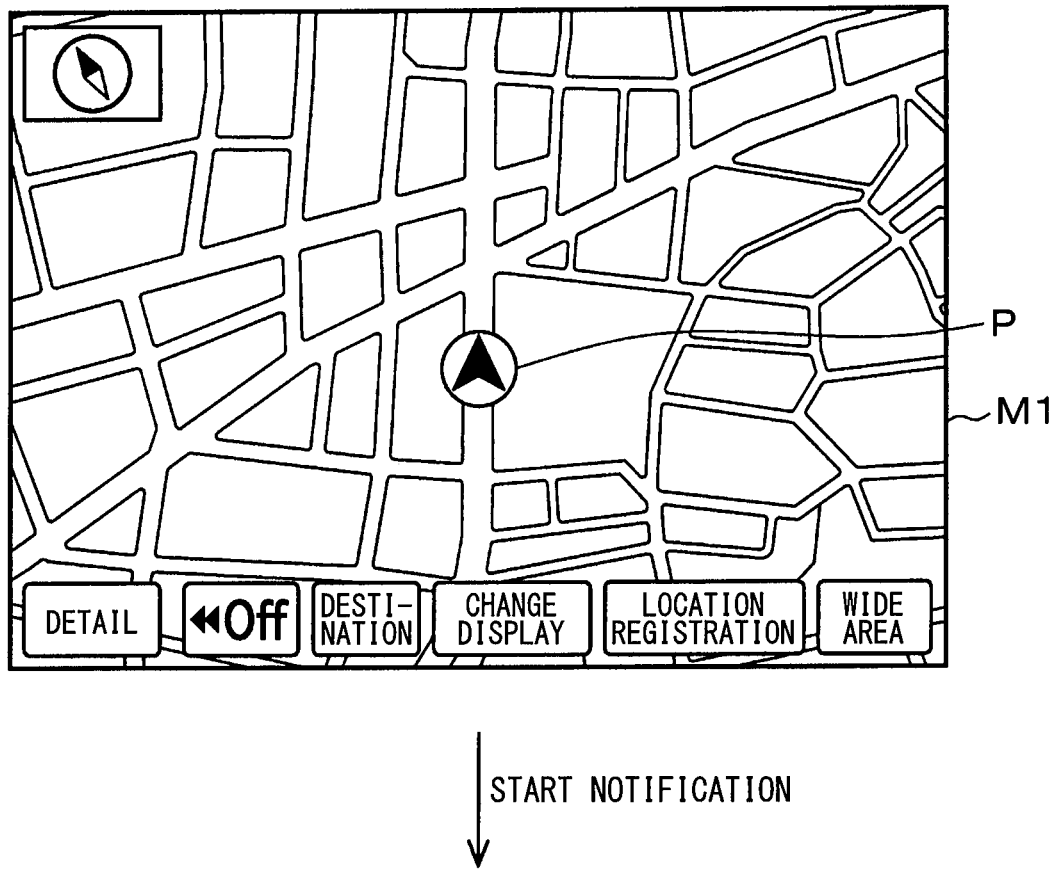
FIG. 4 is a first diagram showing a display manner.
Figure 4:
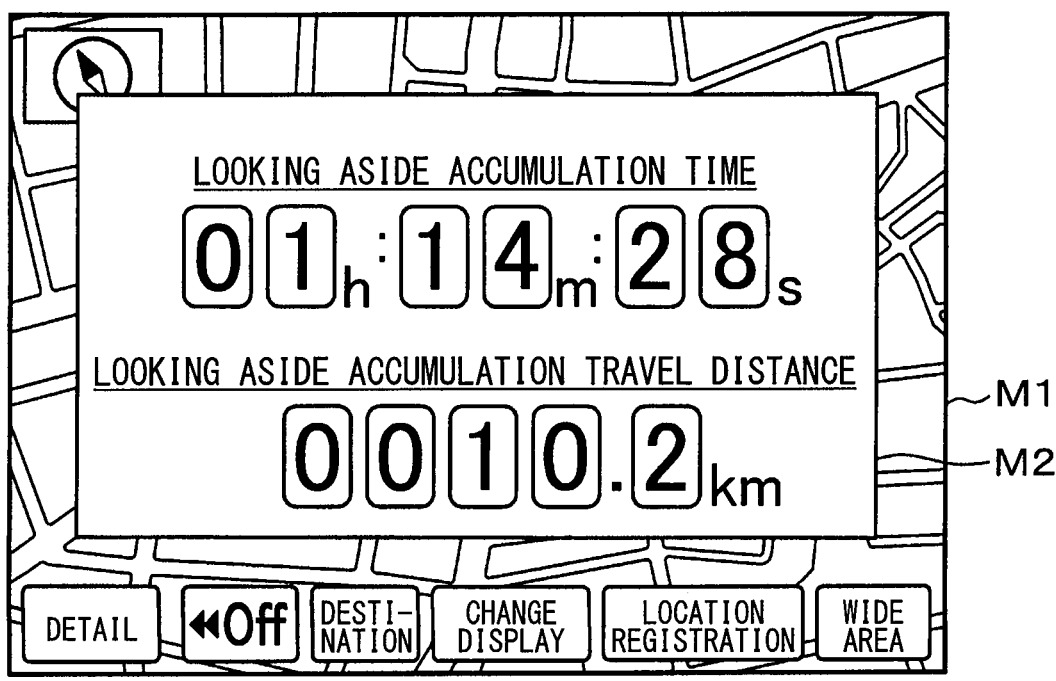

Specifically, when the control portion 8 starts the calculation of the looking aside time information and the looking aside travel distance information, as shown in FIG. 4, the control portion 8 starts a pop-up display of a notification screen M2 on a substantially entire area of a map screen M1. The control portion 8 starts the notification of the looking aside accumulation time and the looking aside accumulation travel distance on the notification screen M2 as the looking aside time information and the looking aside travel distance information, respectively. In this case, the control portion 8 counts up the looking aside accumulation time by one second, and outputs mechanical effect sound in conjunction with the count-up of the value. In this case, the control portion 8 counts up the looking aside accumulation travel distance by 0.1 kilometers, and outputs mechanical effect sound in conjunction with the count-up of the value. In this case, in the control portion 8, each of the mechanical effect sound in conjunction with the count-up of the value of the looking aside accumulation time and the mechanical effect sound in conjunction with the count-up of the value of the looking aside accumulation travel distance has a different type of sound. Alternatively, the control portion 8 may output either the mechanical effect sound in conjunction with the count-up of the value of the looking aside accumulation time or the mechanical effect sound in conjunction with the count-up of the value of the looking aside accumulation travel distance.

Figure 5:
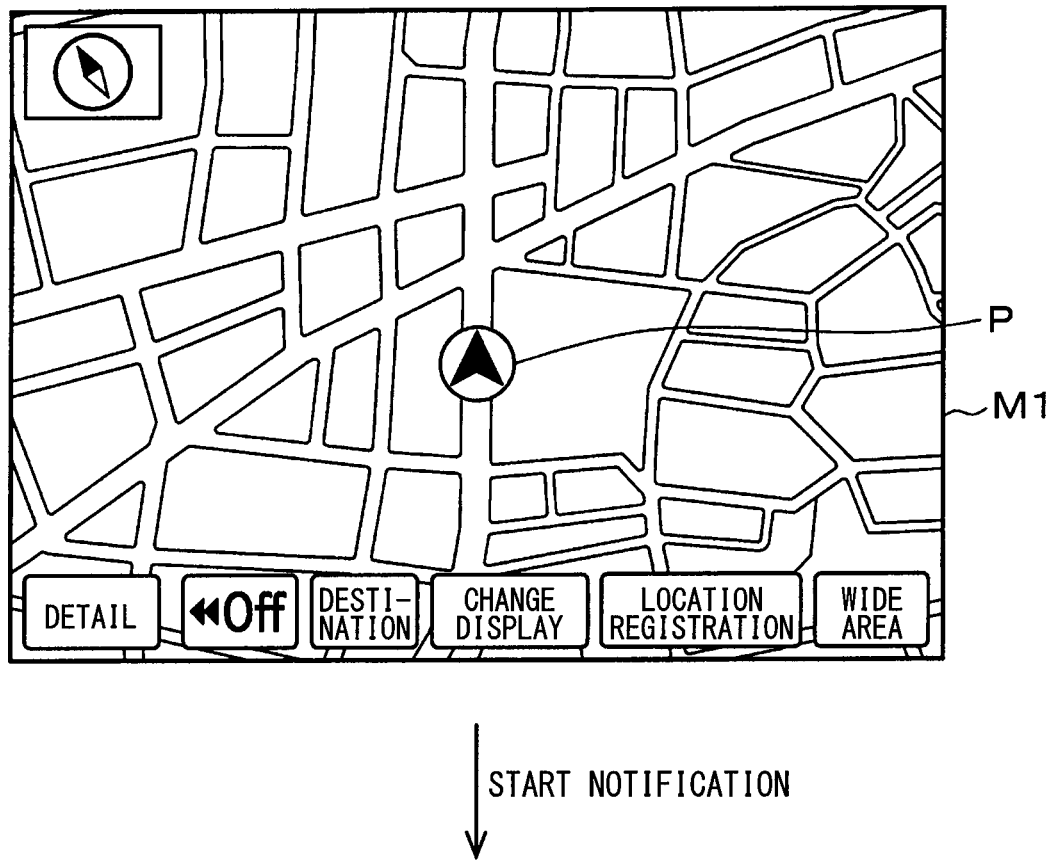
FIG. 5 is a second diagram showing a display manner.
Figure 5:
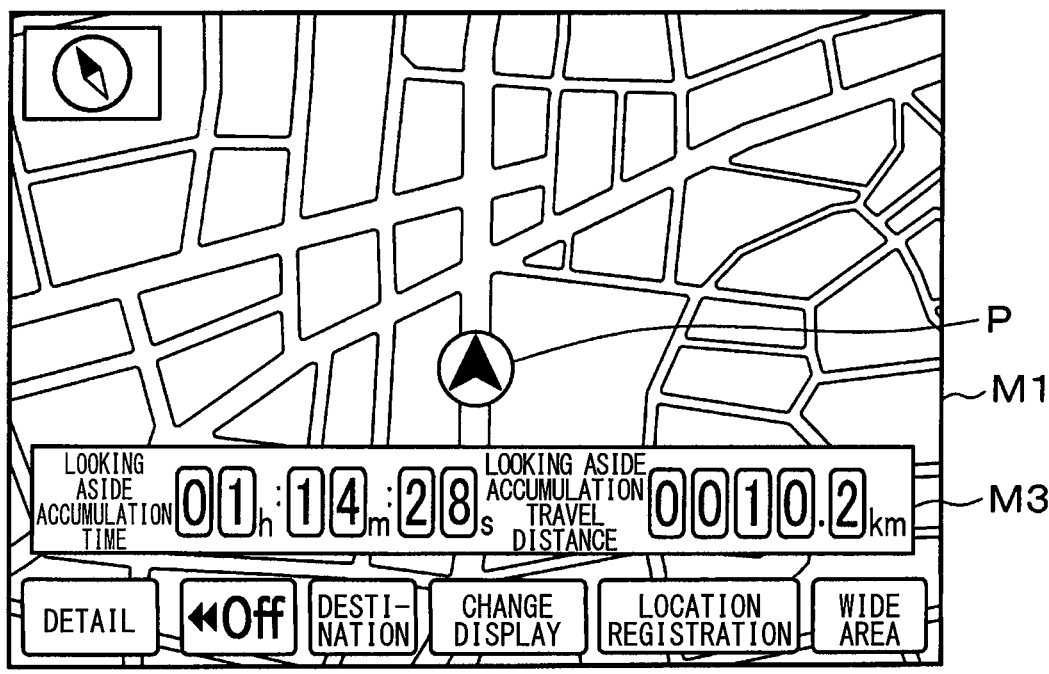

The control portion 8 may notify the looking aside accumulation time and the looking aside accumulation travel distance in any manner. As shown in FIG. 5, the control portion 8 may start showing a pop-up display of notification screen M3 in a lower end area of the map screen M1. That is, the control portion 8 may show the pop-up display so as not to hide a vehicle position mark P indicative of the vehicle position displayed on the map screen M1. The control portion 8 starts the notification of the looking aside accumulation time and the looking aside accumulation travel distance on the notification screen M3, similarly to the notification screen M2, as the looking aside time information and the looking aside travel distance information, respectively. The control portion 8 may start showing the pop-up display of notification screen in an upper end area of the map screen M1, similarly to the notification screen M3.

On the other hand, when the control portion 8 determines that the driver is not in the looking aside state (S5: NO), the control portion 8 determines whether the looking aside state flag is "1" (S10). When the control portion 8 determines that the looking aside state flag is not "1" (S10:NO), the control portion 8 determines whether an end condition of the safe driving assistance processing is satisfied (S17). When the control portion 8 determines that the end condition of the safe driving assistance processing is not satisfied (S17:NO), the procedure returns to step S1 and repeatedly executes the following operations from step S1. When the end condition of the safe driving assistance processing, such as the switching of the ignition switch from the on state to the off state, is satisfied (S17:YES), the control portion 8 finishes the safe driving assistance processing. In the control portion 8, the vehicle velocity less than a predetermined velocity, a performance of a predetermined operation by the driver, or the like may add to the end condition of the safe driving assistance processing.

When determining that the looking aside state flag is "1", that is, the looking aside state had been determined, and determining that the driver is not in the looking aside state in the present determination (S10:YES), the control portion 8 sets the looking aside state flag to "0" (S11) and finishes the calculation of the looking aside time information and the looking aside travel distance information (S12). The control portion 8 calculates the looking aside travel position information (S13), stores the looking aside time information, the looking aside travel distance information, and the looking aside travel position information in the storage portion 10 in association with one another (S14). The control portion 8 determines whether a predetermined time (for example, a few seconds) has elapsed since the calculation of the looking aside time information, and the looking aside travel distance information ended (S15). When determining that the predetermined time has elapsed since the calculation of the looking aside time information, and the looking aside travel distance information ended (S15:YES), the control portion 8 finishes the transmission of the display instruction signal and the sound output instruction signal to the information notification device 7 and finishes the notification of the looking aside time information and the looking aside travel distance information (S16). The control portion 8 determines whether the end condition of the safe driving assistance processing is satisfied (S17).

The control portion 8 notifies the time in which the driver is in the looking aside state and the travel distance of the vehicle in which the driver is in the looking aside state by executing the above-described processing. The configuration can notify the specific time or the specific travel distance in which the driver is in the looking aside state, so that the configuration can appropriately notify the driver that the driver looks aside, and urge the driver to be aware that the driver looks aside.

Figure 6:
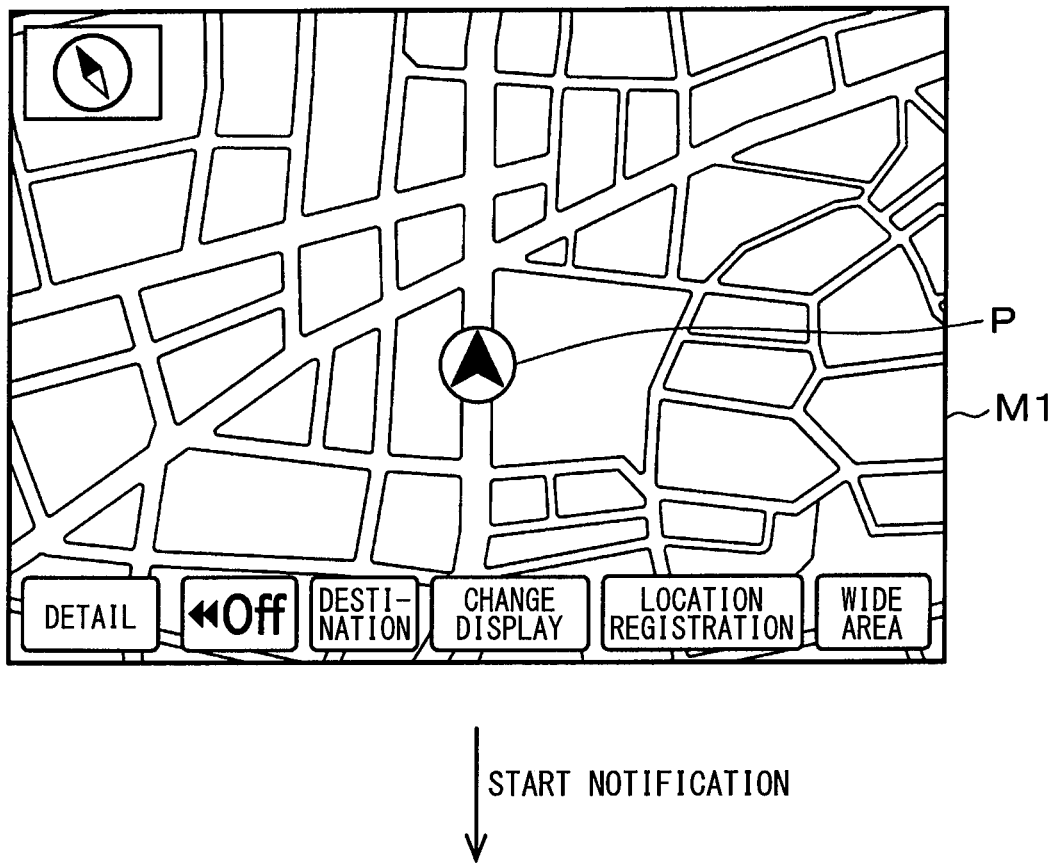
FIG. 6 is a third diagram showing a display manner.
Figure 6:
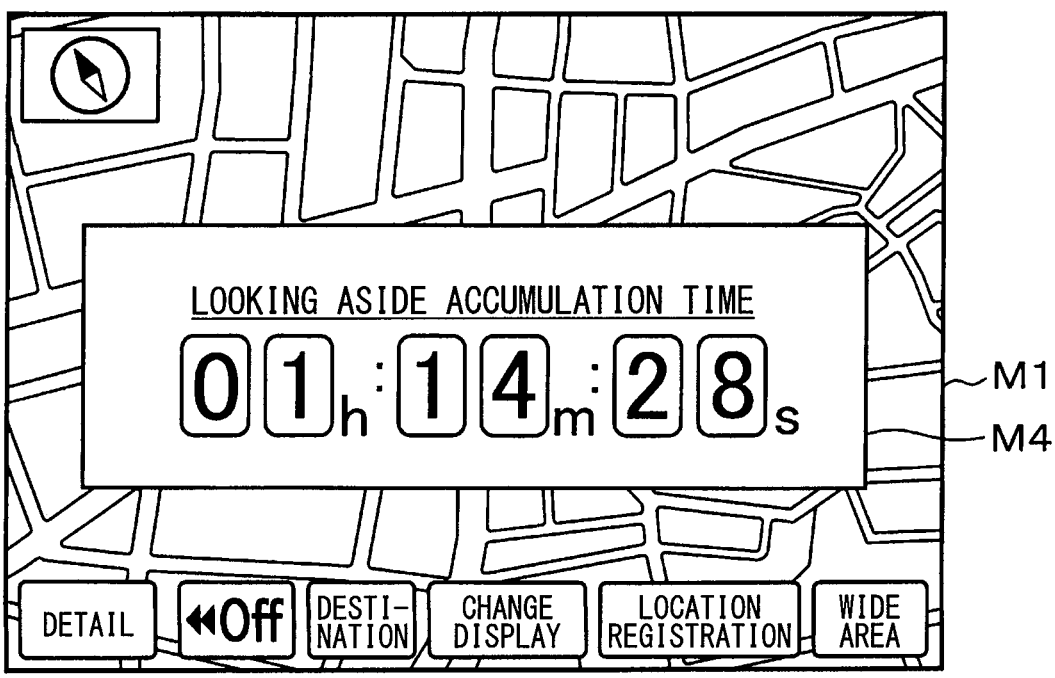
Figure 7:
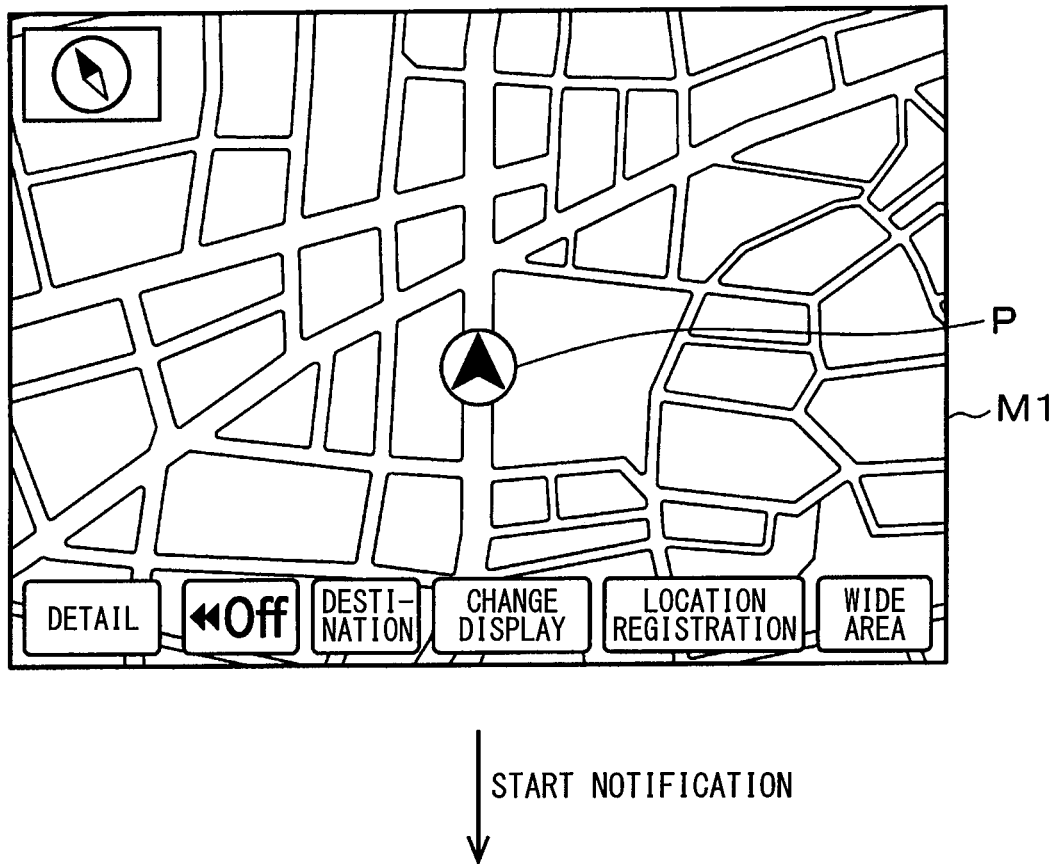
FIG. 7 is a fourth diagram showing a display manner.
Figure 7:
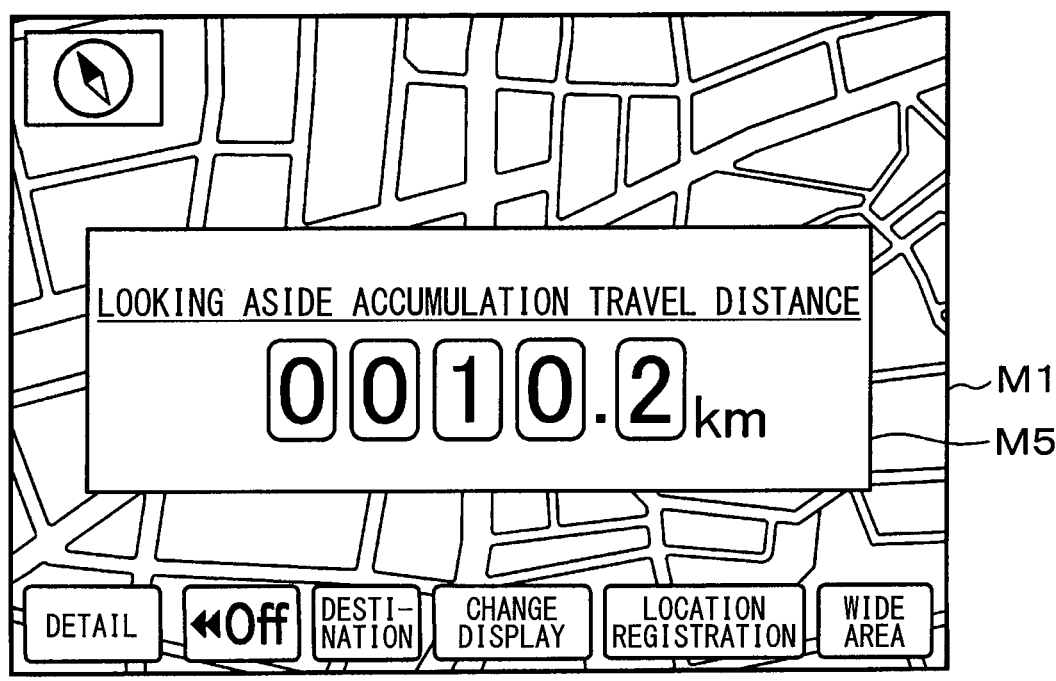

The configuration which notifies the looking aside time information and the looking aside travel distance information has been described. Alternatively, the configuration which notifies either the looking aside time information or the looking aside travel distance information may be employed. That is, as shown in FIG. 6, the control portion 8 may display a pop-up notification screen M4 on the substantially entire area of the map screen M1. With the notification screen M4, the control portion 8 may notify the looking aside accumulation time as the looking aside time information. Alternatively, as shown in FIG. 7, the control portion 8 may display a pop-up notification screen M5 on the substantially entire area of the map screen M1. With the notification screen M5, the control portion 8 may notify the looking aside accumulation travel distance as the looking aside travel distance information. Alternatively, when the driver performs a notification switch operation to the operation device 6, the control portion 8 switches among the manner that notifies the looking aside time information and the looking aside travel distance information, the manner that notifies that looking aside time information, and the manner that notifies looking aside travel distance information.

Figure 8:
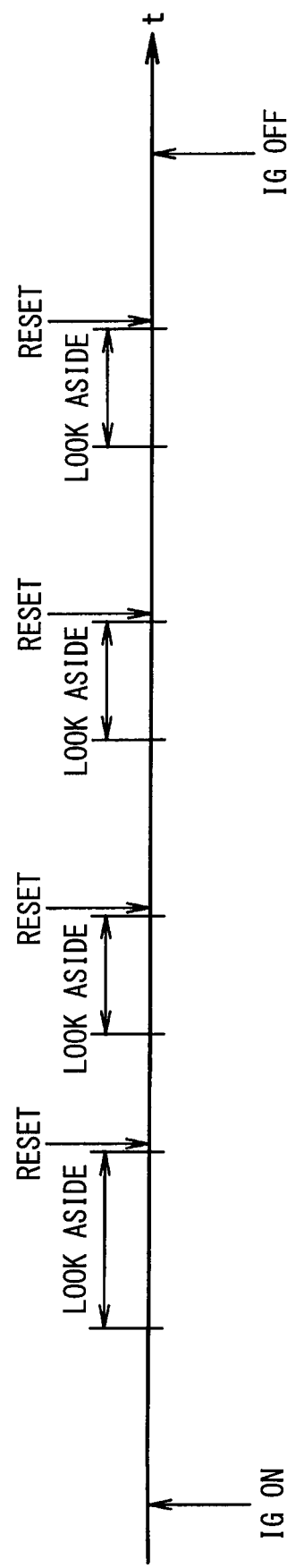
FIG. 8 is a second time point chart.
Figure 9:
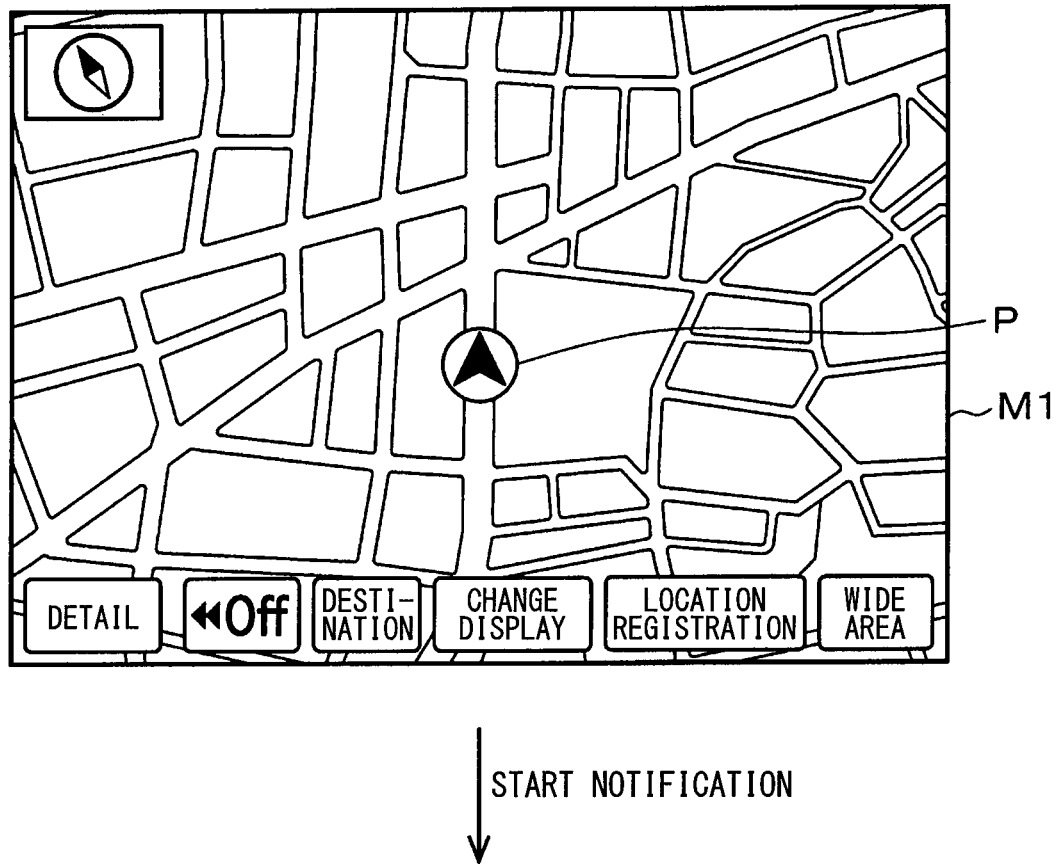
FIG. 9 is a fifth diagram showing a display manner.
Figure 9:
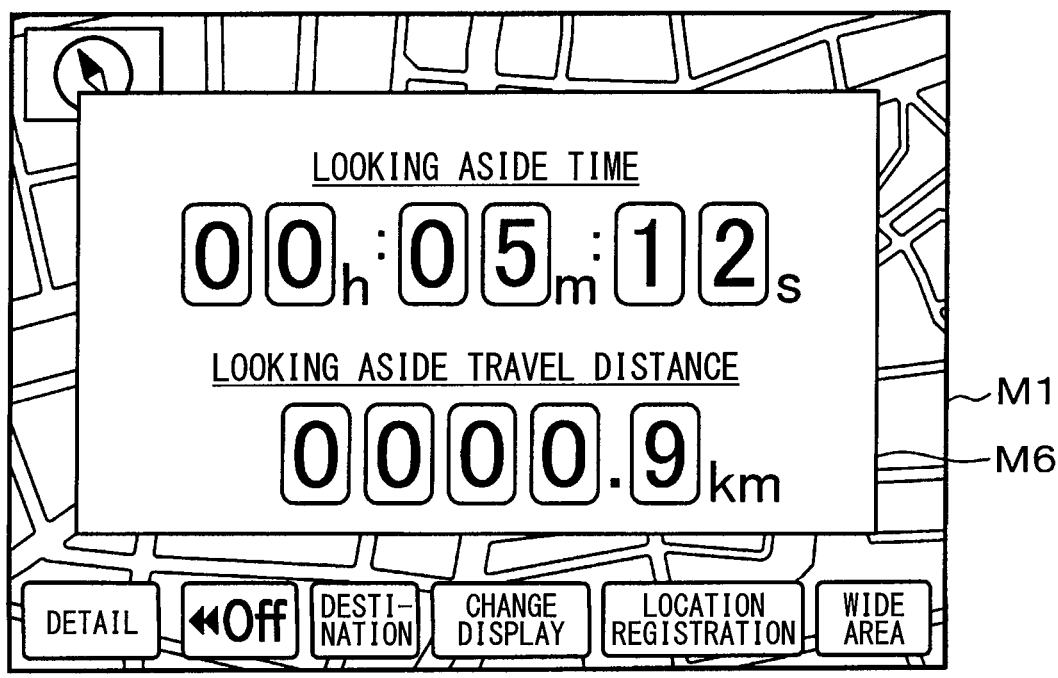

The configuration in which the looking aside accumulation time and the looking aside accumulation travel distance is notified as the looking aside time information and the looking aside travel distance information, respectively has been described above. Alternatively, a configuration in which the looking aside time and the looking aside travel distance for one action of looking aside is notified may be employed. That is, as shown in FIG. 8, the control portion 8 may reset the looking aside time information and the looking aside travel distance information by one action of looking aside. In this case, as shown in FIG. 9, the control portion 8 may display a pop-up notification screen M6 on the substantially entire area of the map screen M1. With the notification screen M6, the control portion 8 may notify the looking aside time information and the looking aside travel distance as the looking aside time information and the looking aside travel distance information, respectively.

Figure 10:
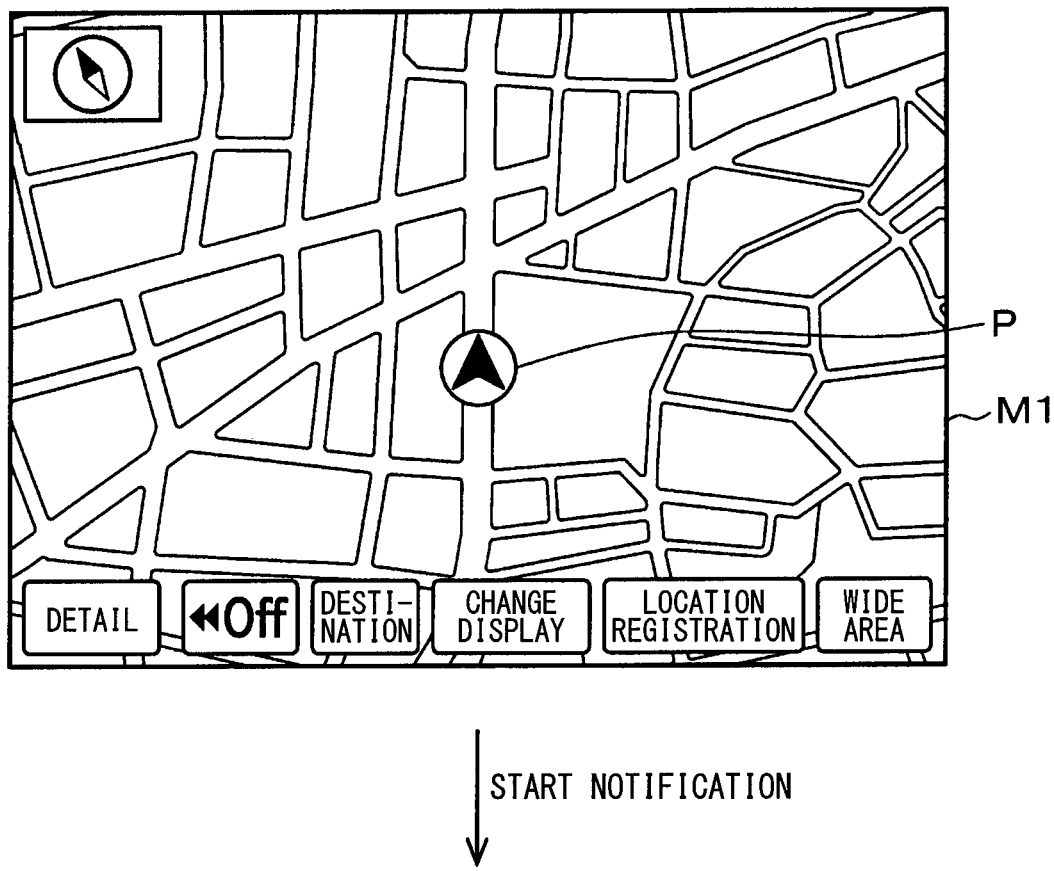
FIG. 10 is a sixth diagram showing a display manner.
Figure 10:
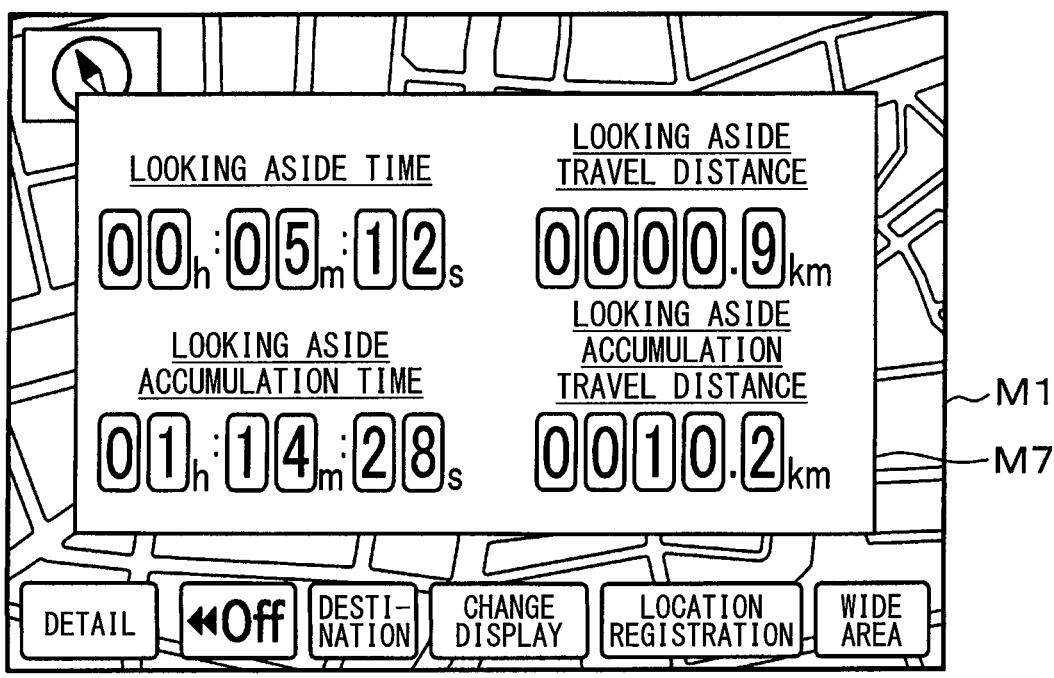

Alternatively, a configuration in which the looking aside time and the looking aside accumulation time is notified as the looking aside time information, and the looking aside travel distance and the looking aside accumulation travel distance is notified as the looking aside travel distance information may be employed. That is, the control portion 8 resets the looking aside time information and the looking aside travel distance information by one action of looking aside, but stores the looking aside time and the looking aside travel distance. As shown in FIG. 10, the control portion 8 may display a pop-up notification screen M7 on the substantially entire area of the map screen M1. With the notification screen M7, the control portion 8 may notify the looking aside time and the looking aside accumulation time as the looking aside time information, and notify the looking aside travel distance and the looking aside accumulation travel distance as the looking aside travel distance information.

The configuration described in the present embodiment can provide advantages below.

Unlike the conventional technique that simply performs the warning, when the driver is in the looking aside state, the safe driving assistance device 2 calculates to notify the looking aside time information and the looking aside travel distance information. The configuration can notify the specific time and the specific travel distance for the driver in the looking aside state, so that the configuration can appropriately notify the driver that the driver looks aside, and urge the driver to be aware that the driver looks aside.

The safe driving assistance device 2 calculates, as the looking aside time information, the looking aside time related to one action of looking aside and the looking aside accumulation time that accumulates the looking aside time in the predetermined period. The safe driving assistance device 2 calculates, as the looking aside travel distance information, the looking aside travel distance related to one action of looking aside and the looking aside accumulation travel distance that accumulates the looking aside travel distance in the predetermined period. Thus, the configuration can cause the drive to grasp the looking aside accumulation time and the looking aside accumulation travel distance which accumulate the looking aside time and the looking aside travel distance in the predetermined period, respectively.

The safe driving assistance device 2 resets the looking aside accumulation time and the looking aside accumulation travel distance in response to the reset operation. Thus, the configuration enables the driver to reset the looking aside accumulation time and the looking aside accumulation travel distance at an arbitrary time point.

The safe driving assistance device 2 causes the display device 7a to display the value of the looking aside time information or the looking aside travel distance information. In addition, the safe driving assistance device 2 causes the sound output device 7b to output the sound in conjunction with the count up of the value. Thus, the configuration can appropriately notify the driver of the fact of looking aside to the senses of sight and hearing. By outputting the periodic sound in conjunction with the count up of the looking aside time (that is, at a time cycle of one second), the configuration can form an environment in the passenger compartment different from an ordinary environment in which the driver is not in the looking aside state, and enables the driver to easily notice the fact of looking aside.

When determining that the driver is in the looking aside state, the safe driving assistance device 2 starts the notification of the looking aside time information and the looking aside travel distance information. When determining that the driver is not in the looking aside state after the start of the notification, the safe driving assistance device 2 finishes the notification of the looking aside time information and the looking aside travel distance information after the elapse of the predetermined time. Thus, the configuration enables the driver to notice that the driver had looked aside by continuing the notification of the looking aside time information and the looking aside travel distance information for a while after the driver stops looking aside.

The safe driving assistance device 2 notifies the looking aside time information and the looking aside travel distance information at the same time. Thus, the configuration can notify the driver of the fact of looking aside in terms of the time and the travel distance. The configuration can cause the driver to grasp the relationship between the time and the travel distance related to the action of the looking aside. For example, the configuration can cause the driver to grasp how long the travel distance is with respect to the time for the action of looking aside.

The safe driving assistance device 2 calculates the looking aside travel position information related to the travel position of the vehicle when the driver is in the looking aside state. The safe driving assistance device 2 causes the storage portion 10 to store the looking aside time information, the looking aside travel distance information, and the looking aside travel position information in association with one another. Thus, suppose that managing a travel history, for example, the configuration can manage a history related to which section, how long, and how far the driver looks aside. The safe driving assistance device 2 stores looking aside history data that associates the looking aside time information with the looking aside travel distance information and the looking aside travel position information, and transmits the looking aside history data to, for example, a management server. With this configuration, the looking aside history data can be widely utilized for identifying a section in which an unspecified large number of drivers is likely to be in the looking aside sate by the management server.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The configuration showing the manner in which the value of the looking aside time information and the looking aside travel distance information is counted up has been described. Alternatively, a configuration showing a manner in which a status bar extends may be employed. Alternatively, a configuration showing a manner in which the status bar extends in conjunction with the count up of the value may be employed. That is, as long as a configuration that notifies the driver of the action of looking aside is employed, the specific time and the travel distance in which the driver is in the looking aside state can be shown in any manner.

The configuration in which the display device 7a is provided by the display configuring the navigation system has been described. Alternatively, the display device 7a may be provided by a head-up display. That is, the pop-up display is not shown on the map screen, but the notification screen is projected on the windshield.

The invention claimed is:

1. A safe driving assistance device comprising a processor configured to:
   determine whether a driver is in a looking aside state;
   calculate at least one of a looking aside time information item and a looking aside travel distance information item as notification information, the looking aside time information item indicating information related to a time when the driver is in the looking aside state, and the looking aside travel distance information item indicating information related to a travel distance of a vehicle when the driver is in the looking aside state;
   cause an information notification portion to notify the notification information;
   calculate a looking aside time, as the looking aside time information item, indicative of a time related to one action of looking aside; and
   calculate a looking aside travel distance, as the looking aside travel distance information item, indicative of a travel distance related to one action of looking aside.

2. The safe driving assistance device according to claim 1, wherein
   the processor is further configured to:
   calculate a looking aside accumulation time, as the looking aside time information item, which accumulates a looking aside time in a predetermined time period; and
   calculate a looking aside accumulation travel distance, as the looking aside travel distance information item, which accumulates a looking aside travel distance in the predetermined time period.

3. The safe driving assistance device according to claim 2, wherein
   the processor is further configured to:
   receive a reset operation; and
   reset at least one of the looking aside accumulation time and the looking aside accumulation travel distance when the processor receives the reset operation.

4. The safe driving assistance device according to claim 1, wherein
   the information notification portion includes a display portion and a sound output portion, and the processor is further configured to:
cause the display portion to display a value included in the notification information; and
cause the sound output portion to output a sound in conjunction with a count up of the value.

5. The safe driving assistance device according to claim 1, wherein
the processor is further configured to finish notifying the notification information after an elapse of a predetermined time when the processor determines that the driver is not in the looking aside state after the processor determines that the driver is in the looking aside state and the processor starts notifying the notification information.

6. The safe driving assistance device according to claim 1, wherein
the processor is further configured to notify the looking aside time information item and the looking aside travel distance information item at a same time.

7. The safe driving assistance device according to claim 1, wherein
the processor is further configured to:
calculate looking aside travel position information indicating information related to a travel position of the vehicle when the driver is in the looking aside state; and
store the notification information and the looking aside travel position information in association with one another.

8. A safe driving assistance program product stored in a non-transitory tangible computer readable storage medium, the safe driving assistance program product comprising instructions to be executed by a controller of a safe driving assistance device,
the instruction comprising:
determining whether a driver is in a looking aside state;
calculating at least one of a looking aside time information item and a looking aside travel distance information item as notification information, the looking aside time information item indicating information related to a time when the driver is in the looking aside state, and the looking aside travel distance information item indicating information related to a travel distance of a vehicle when the driver is in the looking aside state; and
causing an information notification portion to notify the notification information, wherein
the calculating includes:
calculating a looking aside time, as the looking aside time information item, indicative of a time related to one action of looking aside; and
calculating a looking aside travel distance, as the looking aside travel distance information item, indicative of a travel distance related to one action of looking aside.

9. A non-transitory computer readable storage medium that stores the safe driving assistance program product according to claim 8.

10. A safe driving assistance device comprising:
a looking aside state determination portion configured to determine whether a driver is in a looking aside state;
a notification information calculation portion configured to calculate at least one of a looking aside time information item and a looking aside travel distance information item as notification information, the looking aside time information item indicating information related to a time when the driver is in the looking aside state, and the looking aside travel distance information item indicating information related to a travel distance of a vehicle when the driver is in the looking aside state; and
a notification control portion configured to cause an information notification portion to notify the notification information, wherein
the notification information calculation portion is further configured to:
calculate a looking aside time, as the looking aside time information item, indicative of a time related to one action of looking aside; and
calculate a looking aside travel distance, as the looking aside travel distance information item, indicative of a travel distance related to one action of looking aside.

* * * * *